United States Patent

Centala

[15] 3,638,099

[45] Jan. 25, 1972

[54] SELF-EXCITED INVERTER EMPLOYING COMMUTATION TIME TRANSFORMERS

[72] Inventor: John P. Centala, Cedar Rapids, Iowa

[73] Assignee: Collins Radio Company, Cedar Rapids, Iowa

[22] Filed: Mar. 29, 1971

[21] Appl. No.: 128,749

[52] U.S. Cl. .................................. 321/45 R, 331/113 A
[51] Int. Cl. .................................................. H02m 7/48
[58] Field of Search ........................ 321/45 R; 331/113 A

[56] References Cited

UNITED STATES PATENTS

| | | | |
|---|---|---|---|
| 3,092,786 | 6/1963 | Bayne | 321/45 R X |
| 3,263,122 | 7/1966 | Genuit | 331/113 A X |
| 3,281,644 | 10/1966 | Moore et al. | 321/45 R |
| 3,383,582 | 5/1968 | Bishop et al. | 321/45 R X |
| 3,403,319 | 9/1968 | Tate | 321/45 R X |
| 3,417,348 | 12/1968 | Moore | 331/113 A |
| 3,473,104 | 10/1969 | Tate | 321/45 R |

Primary Examiner—William M. Shoop, Jr.
Attorney—Richard W. Anderson and Robert J. Crawford

[57] ABSTRACT

A self-excited saturating transformer inverter is provided with a pair of auxiliary commutating time transformers the windings of which are connected with those of the power transformer and with commutating diode members in circuit with the power transformer output winding in a manner that, during successive half-cycles of operation, alternate ones of the auxiliary transformers "takeover" to provide a continuing load for the driving power. High-current spike generation upon power transformer saturation is thus obviated.

7 Claims, 1 Drawing Figure

PATENTED JAN 25 1972
3,638,099
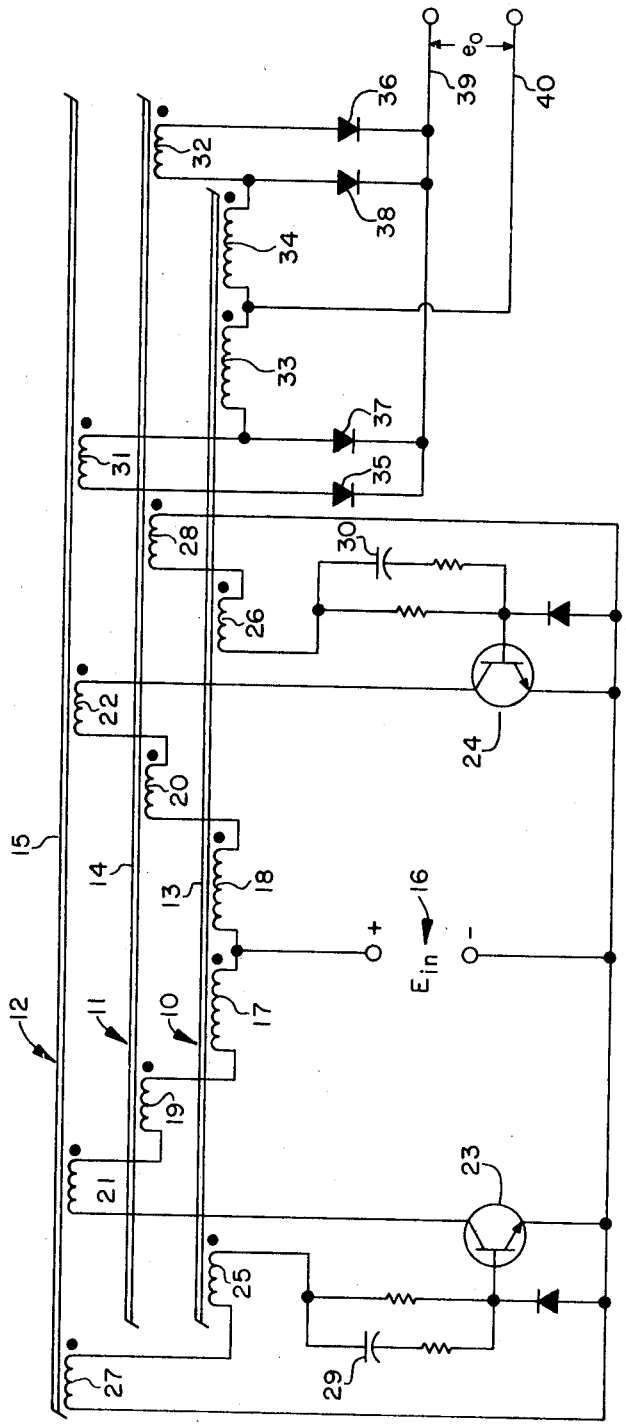
INVENTOR
JOHN P. CENTALA
BY R. W. Anderson
AGENT

SELF-EXCITED INVERTER EMPLOYING COMMUTATION TIME TRANSFORMERS

This invention relates generally to self-excited static inverters and more particularly to an improved self-excited saturating transformer inverter with means to eliminate current spikes resulting from transformer saturation.

Simple self-excited saturating transformer inverters operate on a principle of repeated saturation of a transformer. Simple inverters of this type present a problem in that the low impedance presented by the saturated transformer permits an extremely high current spike to pass through the switching device applying input line power and this spike lasts until the switching device can be turned off. The high current spikes so generated can burn out the switching device, and further, the high current spike is reflected into the output voltage waveform, giving rise to subsequent filtering problems.

The object of the present invention is to provide, in a self-excited saturating transformer inverter, circuitry to prevent the saturated power transformer's low impedance from causing any substantial current increase through the employed switching devices.

The present invention is featured in the incorporation of auxiliary commutating time transformers the windings of which are connected in circuit with those of the power transformer and with commutating diodes members in circuit with the power transformer output winding such that, upon saturation of the primary power transformer during successive half-cycles of operation, an auxiliary transformer winding "takes over" to provide a continuing load for the driving power and thus obviates the generation of high current spikes.

The invention is further featured in the provision of base drive circuitries for a switching transistor pair, which drive circuitries are associated with both a control winding on the primary power transformer and a control winding connected with a respective associated one of first and second auxiliary transformers in a manner that self-excitation is effected.

These and other features and objects of the present invention will become apparent upon reading the following description with reference to the accompanying drawing in which the single FIGURE is a schematic representation of an embodiment of a self-excited saturating transformer inverter in accordance with the present invention.

With reference to the FIGURE, the inverter of the present invention comprises a power transformer 10 with core 13 upon which is wound primary windings 17 and 18, switching transistor base drive windings 25 and 26, and output windings 33 and 34. Switching transistors 23 and 24 are connected in circuit to alternately apply a source of input line DC power 16 through one or the other of the power transformer primary windings 17 and 18.

Diode members 37 and 38 connect between the respective ends of the power transformer output windings 33 and 34 and a first output terminal 39. The junction between the power transformer output windings 33 and 34 provides a second output terminal 40. An output $e_o$ is developed as a full wave rectified DC voltage.

In accordance with the present invention first and second auxiliary commutating time transformers 11 and 12 are employed in addition to the primary power transformer 10. Each of the auxiliary transformers 11 and 12 is provided with primary windings, a base drive sensing winding, and an output winding.

The primary winding 17 of power transformer 10 is serially connected with primary winding 19 of auxiliary transformer 11, primary winding 21 of auxiliary transformer 12, the emitter and collector terminals of switching transistor 23, and the source of line input power 16. Similarly primary winding 18 of power transformer 10 is serially interconnected with primary winding 20 of auxiliary transformer 11, primary winding 22 of auxiliary transformer 12, the emitter and collector terminals of switching transistor 24, and the line voltage source 16.

Base drive windings for switching transistor 23 consist of drive winding 25 on the power transformer 10 serially connected with drive winding 27 on auxiliary transformer 12.

Base drive windings for the other switching transistor 24 comprise a drive winding 26 carried on the power transformer 10 serially connected with drive winding 28 carried on auxiliary transformer 11.

A resistive-capacitive base drive network including a capacitor 29 is serially connected with the base drive windings associated with switching transistor 23 while a further resistive-capacitive base drive circuitry including capacitor 30 is serially interconnected with base drive windings associated with the other switching transistor 24.

Power transformer 10 output winding 33 is serially interconnected with an auxiliary commutating winding 31 on auxiliary transformer 12 through diode 35 to output terminal 39, while output winding 34 is serially interconnected with commutating winding 32 on the other auxiliary transformer 11 through diode member 36 to output terminal 39. The junction between output winding 33 and commutating winding 31 is connected to output terminal 39 through a diode member 37 and the junction between output winding 34 and commutating winding 32 is connected through a diode member 38 to output terminal 39. The junction between power transformer output windings 33 and 34 comprises the second output terminal 40.

In accordance with the present invention, the inverter circuitry operates as a self-excited saturating transformer inverter, employing the commutating time transformers 12 and 11 in conjunction with the commutating diode members associated with the output terminal to eliminate spike currents resulting from transformer saturation. Spike elimination is attained by automatically transferring a load to the input line voltage driving source upon the primary power transformer being saturated during alternate half-cycles of operation.

Operation of the inverter circuitry of the present invention may be described as follows;

Let it be assumed that at an initial time, $t_o$, switching transistor 23 is switched "on," either as a result of an inherent unbalance in the circuitry or by application of some external starting impetus. As will be described, and as is conventional in self-excited inverters, the switching action is cumulative, that is, one switching transistor is rendered conductive and base drive arrangements force it into continued full conduction while forcing the other of the transistors switches to remain in a nonconductive or "off" state. Assuming then that switching transistor 23 is "on" and switching transistor 24 is "off" at an initial time $t_o$, the line DC input voltage 16 is applied across the series combination of primary windings associated with each of the three transformers 10, 11, and 12. Transistor 23, when conductive, effects a low impedance series interconnection between the input line power source 16 and primary windings 17, 19, and 21 of transformers 10, 11, and 12, respectively.

As depicted in the FIGURE, the square hysteresis cores 14 and 15 of the auxiliary transformers 11 and 12 are smaller than that of the main power transformer 10 and, since auxiliary winding transformer 12 has very little load on it at time $t_o$, most of the line input voltage source 16 appears on primary winding 21 of auxiliary transformer 12. Base drive winding 27 of auxiliary transformer 12 provides base drive for the conducting transistor 23 and holds it "on."

A few microseconds after time $t_o$, auxiliary transformer 12, due to its core area and the turns in primary winding 21 thereof, saturates and forces the line input voltage source 16 to appear across primary winding 17 of power transformer 10 and primary winding 19 of the auxiliary transformer 11 only.

Now, referring to the commutating windings 31 and 32 associated with the auxiliary transformers 11 and 12, the turns ratio of power transformer output winding 34 and commutating winding 32 of auxiliary transformer 11 is such that the current in output winding 34 exceeds the current in commutating winding 32, causing current to flow through both diode members 38 and 36. Assuming then that equal voltage drops exist across the diode members 38 and 36, commutating winding 32 of auxiliary transformer 11 has zero voltage induced therein since it is shorted by the conductive diodes 38 and 36. With zero voltage induced in commutating winding 32 of auxiliary transformer 11, it follows that zero voltage must be induced in primary winding 19 of auxiliary transformer 11. Therefore, the line voltage input source 16 is entirely developed across primary winding 17 of the power transformer 10, while base drive winding 25 on power transformer 10 continues to hold switching transistor 23 in on state and winding 26 holds transistor 24 off, and charges up capacitor 30 associated with the base drive network of switching transistor 24. This mode of operation continues for most of the ensuing portion of the first half-cycle of operation until, due to the time involved together with the number of windings in power transformer primary winding 17 and the core material of core 13, power transformer 10 is driven into saturation.

Upon saturation of power transformer 10, the voltage induced in base drive winding 25 of the power transformer drops to zero, and capacitor 29 associated with the base drive network of switching transistor 23 discharges, placing a reverse bias on transistor 23 to initiate its turn-off. Power transformer output winding 34 has zero voltage induced therein due to the saturation of the power transformer, therefore, diode 38 no longer is forward biased and ceases to conduct. Commutating winding 32 on auxiliary transformer 11 is no longer shorted and is enabled to have a voltage induced therein. At that instant all of the line voltage source 16 appears on primary winding 19 of auxiliary transformer 11, while commutating winding 32 of auxiliary transformer 11 supplies an output voltage to the output terminal which is slightly higher than the voltage appearing on the output terminals during normal operation of the power transformer. The slightly higher voltage is due to the turns ratio required for the above discussed operational characteristic of output winding 34 current exceeding that of commutating winding 32. Thus only a very slight input current increase occurs due to the slightly higher output voltage and a current spike is not generated. Assuming ideal components, the slight increase can be made as small as desirable. The voltage in base drive winding 26 of the power transformer, which was holding switching transistor 24 "off," drops to zero; however, base drive winding 28 on auxiliary transformer 11 takes over, keeping switching transistor 24 in the "off" condition.

When the initially conductive switching transistor 23 turns "off" at some finite time after power transformer saturation (as defined by the transistor's storage time and the RC network in the base drive circuitry associated therewith), the voltage induced in base drive winding 28 of auxiliary transformer 11 drops to zero, and capacitor 30 associated with the base drive network of switching transistor 24 discharges through transistor 24, turning transistor 24 on and initiating the second half-cycle.

Due to the symmetrical arrangement of the circuitry, the second half-cycle, initiated at the time that switching transistor 24 is turned on, is operationally the same as the first half-cycle, with winding 18 functioning as winding 17, winding 20 functioning as winding 19, winding 22 functioning as winding 21, winding 26 functioning as winding 25, winding 28 functioning as winding 27, winding 31 functioning as winding 32, and winding 33 functioning as winding 34.

It is noted that the base drive windings associated with transistor 24 include one winding 26 associated with the power transformer and a winding 28 associated with one of the auxiliary transformers while the functionally same windings associated with switching transistor 23 includes a first winding 25 associated again with the power transformer and a second winding associated with the other one of the auxiliary transformers. Similarly, the commutating windings carried in circuit with the power transformer output windings are respectively associated with different ones of the two auxiliary transformers. Since each of the auxiliary transformers is similarly designed, and the aforedefined winding ratio concerning output winding 34 and commutating winding 32 applies similarly to commutating winding 31 and output winding 33, the second half-cycle of operation parallels that of the aforedefined first half-cycle of operation. Thus, for a short time, auxiliary transformer primary winding 20 has all of the line voltage source 16 induced therein with base drive winding 28 of auxiliary winding transformer 11 driving switching transistor 24 in "on" state. As during the first half-cycle, an auxiliary transformer saturates a few microseconds after the initiation of the half-cycle. In the second half-cycle, the other one 11 of the auxiliary transformers saturates, and the other one 18 of the power transformer primary windings takes all of the line input voltage 16 in an operational mode completely similar to that incurred in the first half-cycle. Power transformer output winding 33 and the commutating winding 31 associated with auxiliary transformer 12 have a turns ratio such that the current developed in output winding 33 exceeds that developed in commutating winding 31 to render both diodes 35 and 37 conductive and short out commutating winding 31. The second half-cycle continues until power transformer 10 saturates in the opposite direction, whereupon primary winding 22 of auxiliary transformer 12 takes over in the same manner that primary winding 19 of auxiliary transformer 11 functioned in the first half-cycle. When switching transistor 24 turns off, capacitor 29 associated with the base drive network of transistor 23 discharges through transistor 23 to turn it on and initiate a repeat first half-cycle.

The present invention is thus seen to provide, in a self-driven DC—DC converter, means for preventing the power transformer from presenting a low impedance when its core saturates. High current impulses are prevented at the expense only of slight differentials in the output voltage during the operational cycle, which differential can be made to be minimal.

Although the present invention has been described with respect to a particular embodiment thereof, it is not to be so limited as changes might be made therein which fall within the scope of the invention as defined in the appended claims.

I claim:

1. A static DC power inverter comprising a power transformer, first and second auxiliary transformer, each of said power and auxiliary transformers including a square hysteresis saturable core member, said power transformer comprising first and second like-wound serially connected primary windings and first and second like-wound serially connected output windings, each of said auxiliary transformers comprising first and second like-wound primary windings and a secondary winding, an input DC power source, said power transformer first primary winding being series connected in like polarization with respective first ones of each of said first and second auxiliary transformer primary windings, said power transformer second primary winding being series connected in like polarization with respective second ones of each of said first and second auxiliary transformer primary windings, switching means for alternately serially connecting said DC power source across respective serially connected ones of said power and first and second auxiliary transformer primary windings, the junction between said power transformer secondary windings comprising a first output terminal, each of said auxiliary transformer secondary windings being series connected with an individual one of said power transformer output windings, and each of said auxiliary transformer secondary windings being shunted by an associated one of first and second pairs of like-polarized diode members to a second output terminal.

2. A power inverter as defined in claim 1 wherein the turns ratio between said power transformer output windings and the series connected one of said auxiliary transformer output windings defines an induced current in said power transformer output winding in excess of that induced through the series connected one of said auxiliary transformer output windings.

3. A power inverter as defined in claim 2 wherein the core area and primary winding turns of said auxiliary transformers effects saturation thereof prior to that of the series connected one of said power transformer primary windings during the alternate periods when said DC power source is applied thereto.

4. A power inverter as defined in claim 3 comprising core areas and turns ratios to effect saturation of one of said auxiliary transformers shortly after the application of said DC power source to the primary winding thereof during a first half-cycle of operation followed by saturation of said power transformer at a period of time substantially near the conclusion of said first half-cycle, and saturation of the other one of said auxiliary transformers at a time shortly after the application of power of said DC power source thereto during the second half-cycle followed by saturation of said power transformer at a time substantially near the conclusion of said second half-cycle.

5. A power inverter as defined in claim 4 wherein said switching means comprises first and second switching transistors the emitter and collector terminals of which are serially connected with said DC voltage source and respective ones of said serially connected power and auxiliary transformer primary windings, and base drive means associated with each of said transistors to alternately render said switching transistors conductive at a predetermined periodic rate.

6. A power inverter as defined in claim 5 wherein said base drive means comprises a first pair of like-polarized base drive windings wound respectively on said power transformer and a first one of said auxiliary transformers and serially connected between the base and emitter terminals of a first one of said slitching transistors, and a further pair of base drive windings wound respectively with like polarization on said power transformer and the other one of said auxiliary transformers and serially connected between the base and emitter terminals of the other one of said switching transistors.

7. A power inverter as defined in claim 6 wherein said base drive means further comprises first and second RC networks, each of said networks being serially connected between the base of an individual one of said switching transistors and the associated one of said pairs of base drive windings.

* * * * *